United States Patent
Yoo et al.

(10) Patent No.: US 11,159,252 B2
(45) Date of Patent: Oct. 26, 2021

(54) ELECTRONIC DEVICE FOR TRANSMITTING OR RECEIVING WIRELESS SIGNAL AND METHOD FOR CONTROLLING ELECTRONIC DEVICE

(71) Applicant: Samsung Electronics Co., Ltd., Gyeonggi-do (KR)

(72) Inventors: Jonghun Yoo, Gyeonggi-do (KR); Dongil Yang, Gyeonggi-do (KR); Hyoseok Na, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/955,938

(22) PCT Filed: Dec. 6, 2018

(86) PCT No.: PCT/KR2018/015411
§ 371 (c)(1),
(2) Date: Jun. 19, 2020

(87) PCT Pub. No.: WO2019/124833
PCT Pub. Date: Jun. 27, 2019

(65) Prior Publication Data
US 2021/0021354 A1 Jan. 21, 2021

(30) Foreign Application Priority Data
Dec. 22, 2017 (KR) .......................... 10-2017-0177756

(51) Int. Cl.
*H04B 17/17* (2015.01)
*H04B 17/318* (2015.01)
*H04B 1/04* (2006.01)

(52) U.S. Cl.
CPC ........... *H04B 17/17* (2015.01); *H04B 1/0475* (2013.01); *H04B 17/318* (2015.01); *H04B 2001/0408* (2013.01)

(58) Field of Classification Search
CPC .... H04B 17/17; H04B 17/318; H04B 1/0475; H04B 2001/0408; H04B 17/103
See application file for complete search history.

(56) References Cited

U.S. PATENT DOCUMENTS

| 6,556,815 B1 | 4/2003 | Shibamura |
| 7,860,185 B2 | 12/2010 | Utsunomiya et al. |

(Continued)

FOREIGN PATENT DOCUMENTS

| CN | 101588187 A | 11/2009 |
| JP | 2007-274399 A | 10/2007 |

(Continued)

*Primary Examiner* — Dac V Ha
(74) *Attorney, Agent, or Firm* — Cha & Reiter, LLC (57) ABSTRACT

An electronic device is disclosed and may comprise: an amplifier for amplifying a signal; a filter circuit for filtering the amplified signal; a coupler for delivering a feedback signal with respect to the filtered signal; an antenna for radiating the filtered signal to the outside; and a communication circuit for generating the signal, wherein communication circuit: generates a signal, using designated information; delivers the generated signal to the amplifier; acquires, from the coupler, a first feedback signal and a second feedback signal with respect to signals amplified by the amplifier; and determines whether there is an error in a signal transmitted to an external apparatus, on the basis of the designated information, magnitude information of the first feedback signal, and frequency information of the second feedback signal. In addition, various embodiments recognized through the specification are possible.

11 Claims, 5 Drawing Sheets

(56) References Cited

U.S. PATENT DOCUMENTS

| | | | |
|---|---|---|---|
| 9,392,558 B2 | 7/2016 | See et al. | |
| 9,450,623 B2 | 9/2016 | Weissman et al. | |
| 9,632,130 B2 | 4/2017 | Joung et al. | |
| 2005/0105642 A1* | 5/2005 | Muller | H04L 27/368 375/296 |
| 2008/0144539 A1* | 6/2008 | Sperlich | H04L 5/1469 370/278 |
| 2009/0190647 A1 | 7/2009 | Utsunomiya et al. | |
| 2010/0172398 A1* | 7/2010 | Sekino | H03F 1/34 375/221 |
| 2011/0092173 A1* | 4/2011 | McCallister | H04B 1/0475 455/108 |
| 2013/0331042 A1 | 12/2013 | See et al. | |
| 2016/0087658 A1 | 3/2016 | Weissman et al. | |
| 2016/0202309 A1 | 7/2016 | Joung et al. | |
| 2018/0115288 A1* | 4/2018 | Konno | H03F 1/3282 |
| 2018/0175808 A1* | 6/2018 | Ota | H03F 1/3247 |

FOREIGN PATENT DOCUMENTS

| | | | |
|---|---|---|---|
| KR | 2000-0077445 A | 12/2000 | |
| KR | 10-2006-0110539 A | 10/2006 | |
| KR | 10-2007-0071567 A | 7/2007 | |
| KR | 10-1085289 B1 | 11/2011 | |
| KR | 10-2012-0006404 A | 1/2012 | |

* cited by examiner

ELECTRONIC DEVICE FOR TRANSMITTING OR RECEIVING WIRELESS SIGNAL AND METHOD FOR CONTROLLING ELECTRONIC DEVICE

CROSS REFERENCE TO RELATED APPLICATIONS

This application is a National Phase Entry of PCT International Application No. PCT/KR2018/015411, which was filed on Dec. 6, 2018, and claims a priority to Korean Patent Application No. 10-2017-0177756, which was filed on Dec. 22, 2017, the contents of which are incorporated herein by reference.

TECHNICAL FIELD

Embodiments disclosed in this specification relate to a technology for transmitting or receiving a wireless signal.

BACKGROUND ART

A mobile electronic apparatus such as a smartphone, a tablet, or the like may communicate with a network, using an antenna module. The mobile electronic apparatus may transmit or receive a specified signal by forming an electrical path according to a communication method (e.g., 3rd generation (3G), 4th generation (4G), and 5th generation (5G) communication). The mobile electronic apparatus may generate a signal according to the set frequency, may amplify the generated signal to a set magnitude, and may transmit the amplified signal to an external apparatus.

DISCLOSURE

Technical Problem

To communicate with another electronic apparatus, an electronic apparatus may amplify and transmit a signal of a specified frequency to a specified magnitude; the function of the configuration for transmitting a signal may be lost due to abnormal operation of a transmission system. When the electronic apparatus has an error in a phase locked loop (PLL) lock function for synchronizing signals or a signal of a frequency different from the specified frequency is generated, the configuration for transmitting a signal may be broken (or the function is lost).

The electronic apparatus according to various embodiments may determine an error of a transmission signal by identifying the frequencies and magnitudes of a plurality of feedback signals for the transmission signal.

Technical Solution

According to an embodiment disclosed in this specification, an electronic apparatus may include an amplifier for amplifying a signal, a filter circuit for filtering the amplified signal, a coupler for delivering a feedback signal with respect to the filtered signal, an antenna for radiating the filtered signal to an outside, and a communication circuit for generating the signal. The communication circuit may generate a signal, using specified information, may deliver the generated signal to the amplifier, may obtain a first feedback signal and a second feedback signal with respect to signals amplified through the amplifier, from the coupler, and may determine whether there is an error in a signal transmitted to an external apparatus, based on the specified information, magnitude information of the first feedback signal, and frequency information of the second feedback signal.

Furthermore, according to an embodiment disclosed in this specification, a control method of an electronic apparatus may include generating a signal, using specified information, delivering the generated signal to an amplifier, obtaining a first feedback signal and a second feedback signal with respect to signals amplified through the amplifier, from a coupler, and determining whether there is an error in a signal transmitted to an external apparatus, based on the specified information, magnitude information of the first feedback signal, and frequency information of the second feedback signal.

Moreover, according to an embodiment disclosed in this specification, a computer-readable recording medium may record a program for performing a method including generating a signal, using specified information, delivering the generated signal to an amplifier, obtaining a first feedback signal and a second feedback signal with respect to signals amplified through the amplifier, from a coupler, and determining whether there is an error in a signal transmitted to an external apparatus, based on the specified information, magnitude information of the first feedback signal, and frequency information of the second feedback signal.

Advantageous Effects

According to various embodiments disclosed in this specification, an electronic apparatus may determine whether there is an error in the transmission signal to the external apparatus by identifying the magnitudes and frequencies of the signal amplified to transmit through the coupler and the reflection signal of the amplified signal, thereby preventing the function of configuration of the electronic apparatus from being lost due to the error of the transmission signal.

Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
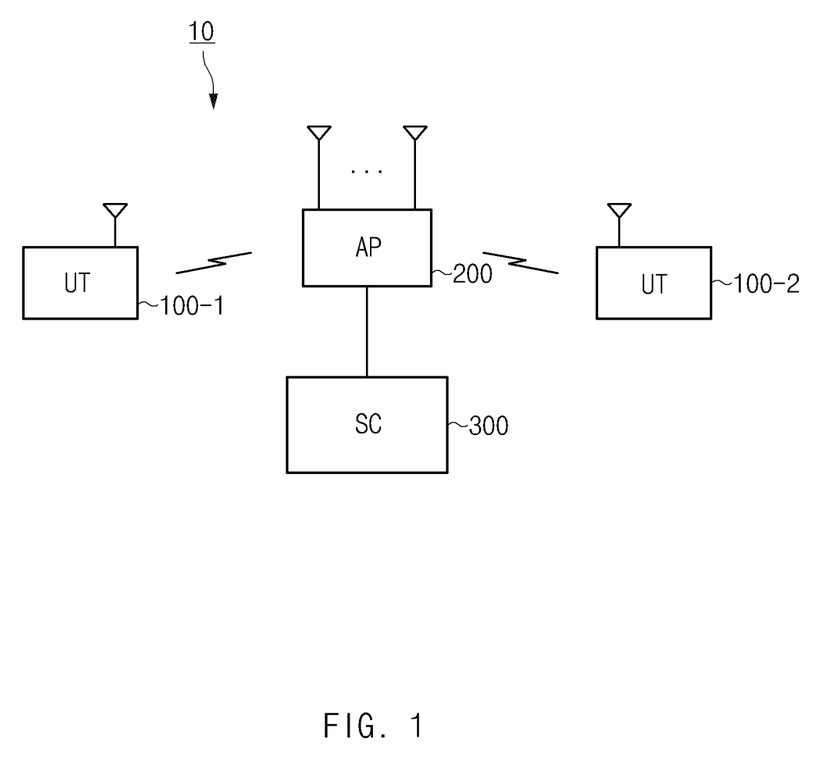
FIG. 1 is a diagram illustrating a wireless communication system according to various embodiments.

FIG. 1 is a diagram illustrating a wireless communication system according to various embodiments.

Referring to FIG. 1, a wireless communication system 10 may include a first electronic apparatus (user terminal (UT)) 100-1, a second electronic apparatus 100-2, an access point (AP) 200, and a system controller (SC) 300.

According to an embodiment, the first UT 100-1 and the second UT 100-2 may transmit or receive signals to or from each other. For example, the first UT 100-1 may communicate with the second UT 100-2 through the AP 200. For another example, when the second UT 100-2 is connected to another AP, the first UT 100-1 may communicate with the second UT 100-2 through the SC 300. For another embodiment, the first user terminal 100-1 may directly communicate with the second UT 100-2.

According to an embodiment, to communicate with the second UT 100-2, the first UT 100-1 may transmit a signal of a specified frequency having a specified magnitude to the second UT 100-2 or the AP 200. According to an embodiment, the second UT 100-2 or the AP 200 may receive the signal of the specified frequency.

According to an embodiment, the first UT 100-1 and the second UT 100-2 may be wireless communication devices such as a smart phone, a laptop computer, a tablet PC, or the like.

According to an embodiment, the AP 200 may be a fixed station for communicating with a UT. For example, the AP 200 may transmit information received from the first UT 100-1 to the second UT 100-2. According to an embodiment, the AP 200 may be a base station (BS), an evolved Node B (eNB), or the like.

According to an embodiment, the SC 300 may be connected to a plurality of APs to control communication between APs. For example, the SC 300 may receive a signal of the first UT 100-1 through the AP 200 and may transmit the signal to the second UT 100-2 connected to another AP.

To communicate with the second UT 100-2, the first UT 100-1 may amplify and transmit a signal of a specified frequency to a specified magnitude; the function of the configuration for transmitting a signal may be lost due to abnormal operation of a transmission system. For example, when an error occurs in the phase locked loop (PLL) lock function for synchronizing a signal, a signal of a frequency different from the specified frequency is generated, reflected from a filter circuit, or the like, and delivered again to an amplifier, thereby damaging the amplifier (or the function is lost). For another example, when an error occurs in the switching operation of the amplifier for amplifying a signal, the signal may be reflected inside the amplifier and then the amplifier may be damaged. The electronic apparatus (or UT) according to various embodiments of the disclosure may prevent a configuration for transmitting and receiving a signal from being damaged, by detecting an error of the transmission signal through a feedback signal for the transmission signal.

Figure 2:
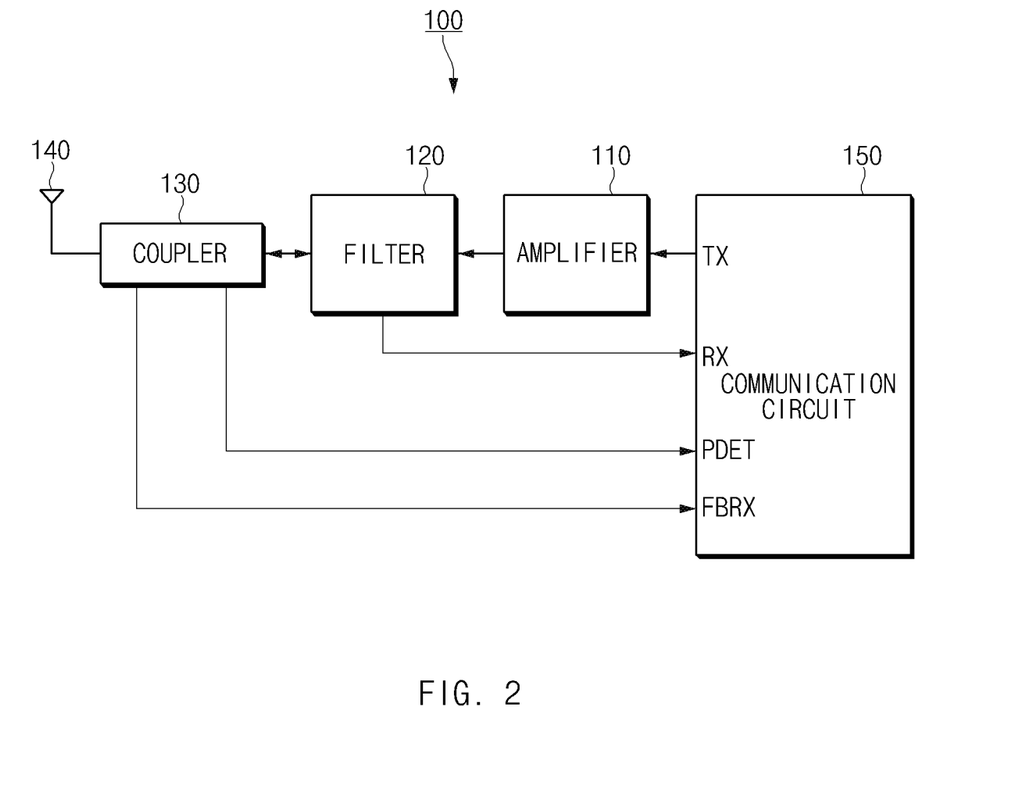
FIG. 2 is a block diagram illustrating a configuration of an electronic apparatus according to various embodiments.

FIG. 2 is a block diagram illustrating a configuration of an electronic apparatus according to various embodiments.

Referring to FIG. 2, an electronic apparatus 100 (e.g., the first UT 100-1 of FIG. 1) may include an amplifier 110, a filter circuit 120, a coupler 130, an antenna 140, and a communication circuit 150.

According to an embodiment, the amplifier 110 may amplify the signal radiated through the antenna 140 to a specified magnitude. For example, the specified magnitude may be determined based on at least one of a type of communication (e.g., 3rd generation (3G), 4th generation (4G), and 5th generation (5G) communication), the radiation efficiency of the transmission signal through the antenna 140, and the radiation distance of the transmission signal. According to an embodiment, the amplifier 110 may deliver the amplified signal to the filter circuit 120. According to an embodiment, the amplifier 110 may include a power amplifier (PA) that amplifies the power of the input signal.

According to an embodiment, the filter circuit 120 may filter a signal in a specified frequency band. In other words, the filter circuit 120 may selectively pass a signal in the specified frequency band. For example, the filter circuit 120 may include a band pass filter (BPF) to pass a signal in the specified frequency band. According to an embodiment, the filter circuit 120 may filter (or separate) the input signal depending on a specified frequency. For example, the filter circuit 120 may filter the signal transmitted from the amplifier 110 to radiate the filtered signal through the antenna 140. In addition, the filter circuit 120 may filter the signal received through the antenna 140 to transmit the filtered signal to the communication circuit 150.

According to an embodiment, the filter circuit 120 may include a duplexer for distinguishing between transmitted and received signals. For example, the filter circuit 120 may use a frequency domain duplex (FDD) scheme and may include front-end module with integrated duplexers (FEMid) including an antenna switch.

According to an embodiment, the coupler 130 may deliver a transmission signal transmitted from the filter circuit 120 to the antenna 140. In other words, the signal output from the filter circuit 120 may be radiated to the antenna 140 through the coupler 130. In addition, the coupler 130 may transmit the signal received through the antenna 140 to the filter circuit 120.

According to an embodiment, the coupler 130 may transmit a feedback signal for the transmitted or received signal to the communication circuit 150. For example, the coupler 130 may transmit a part of a signal, which is transmitted or received, as a feedback signal to the communication circuit 150. For example, the feedback signal may include at least part of the transmitted or received. According to an embodiment, the coupler 130 may deliver a first feedback signal (or a forward coupling signal) and a second feedback signal (or a reverse coupling signal) for the transmission signal to the communication circuit 150. For example, the first feedback signal may refer to a feedback signal of the signal amplified through the amplifier 110. In other words, the first feedback signal may be a feedback signal of the amplified signal that has passed through the filter circuit 120. The second feedback signal may refer to a feedback signal of the amplified signal reflected from the antenna 140. Accordingly, the coupler 130 may deliver the transmission signal and the feedback signal of a reflection signal to the communication circuit 150. According to an embodiment, the coupler 130 may be a bidirectional coupler capable of delivering the feedback signal of each of the transmission signal and the reflected signal to the communication circuit.

According to an embodiment, the antenna 140 may radiate or receive a signal in a specified frequency band. For example, the antenna 140 may form a current path formed by the applied power to radiate or receive a signal in the specified frequency band. For example, the signal of the specified frequency may include information (e.g., content information) to be transmitted or received.

According to an embodiment, the communication circuit 150 may receive a signal of a specified frequency from an external apparatus (e.g., the second electronic apparatus 100-2 or the AP 200 of FIG. 1). For example, the communication circuit 150 may receive the signal received through the antenna 140, from the filter circuit 120. For example, the received signal may be received through an RX port.

According to an embodiment, the communication circuit 150 may transmit a signal of a specified frequency to an external electronic apparatus (e.g., the second electronic apparatus 100-2 of FIG. 1). For example, the communication circuit 150 may generate the specified frequency signal depending on specified information. For example, the specified information may include information (e.g., frequency information) necessary to transmit a signal. Accordingly, the communication circuit 150 may generate the signal of a specified frequency, using frequency information included in the specified information.

According to an embodiment, the communication circuit 150 may deliver the generated signal to the amplifier 110. For example, the communication circuit 150 may deliver the generated signal to the amplifier 110 through the TX port. According to an embodiment, the signal transmitted to the amplifier 110 may be amplified to a specified magnitude and then may be transmitted to an external apparatus through the antenna 140. According to an embodiment, the amplified signal (or the transmission signal) may be delivered to the antenna 140 through the filter circuit 120.

According to an embodiment, the communication circuit 150 may receive a feedback signal of the amplified signal from the coupler 130. In other words, the communication circuit 150 may obtain a feedback signal of the amplified signal, which has passed through the filter circuit 120, from the coupler 130. For example, the communication circuit 150 may receive a first feedback signal and a second feedback signal for the transmission signal. For example, the first feedback signal may refer to a feedback signal of the signal amplified through the amplifier 110. The second feedback signal may refer to a feedback signal of the amplified signal reflected from the antenna 140. For example, the reflected signal may have the same frequency features as the amplified signal reflected from the filter circuit 130. According to an embodiment, the communication circuit 150 may determine that there is reflection in at least one of the amplifier 110 and the filter circuit 120, by identifying the frequency of the reflected signal.

According to an embodiment, the communication circuit 150 may receive both the first feedback signal and the second feedback signal. For example, the communication circuit 150 may receive a first feedback signal at a first port and may receive a second feedback signal at a second port. For example, the first port may be a power detector (PDET) port for identifying the magnitude of the input signal. Furthermore, the communication circuit 150 may receive the second feedback signal at the second port. For another example, the second port may be a feedback receiver (FBRX) port for identifying the frequency of the input signal.

According to an embodiment, the communication circuit 150 may determine an error of the transmission signal based on the specified information, the first feedback signal, and the second feedback signal. For example, the specified information may include information about the frequency and magnitude of a signal transmitted to an external apparatus.

According to an embodiment, the communication circuit 150 may identify the magnitude of the first feedback signal. According to an embodiment, the communication circuit 150 may determine whether the identified magnitude differs from a specified magnitude by a specified value or more. For example, the specified magnitude may be determined based on the magnitude of the signal amplified by the amplifier 110.

According to an embodiment, the communication circuit 150 may identify the frequency of the second feedback signal. According to an embodiment, the communication circuit 150 may determine whether the identified frequency corresponds to a specified frequency.

According to an embodiment, when the first feedback signal differs from the specified magnitude by the specified value or more or when the frequency of the second feedback signal does not correspond to the specified frequency (or a frequency band), the communication circuit 150 may determine that there is an error in the transmission signal. According to an embodiment, when it is determined that the error is present in the transmitted signal, the communication circuit 150 may stop generating the transmission signal.

According to another embodiment, the electronic apparatus 100 may identify the frequency for a first feedback signal (or the feedback signal of the amplified signal) and may determine the error of the transmission signal by identifying the magnitude of the second feedback signal (the feedback signal of the reflected signal). In other words, unlike the above-described example, the electronic apparatus may identify the frequency of the first feedback signal, may identify the magnitude of the second feedback signal, and thus may determine the error of the transmission signal. The specified frequency for identifying the frequency of the first feedback signal may be similar to the above-described embodiment, but the specified magnitude for identifying the magnitude of the second feedback signal may be different from the above-described embodiment. For example, the specified magnitude may be smaller than the above-described example.

Figure 3:
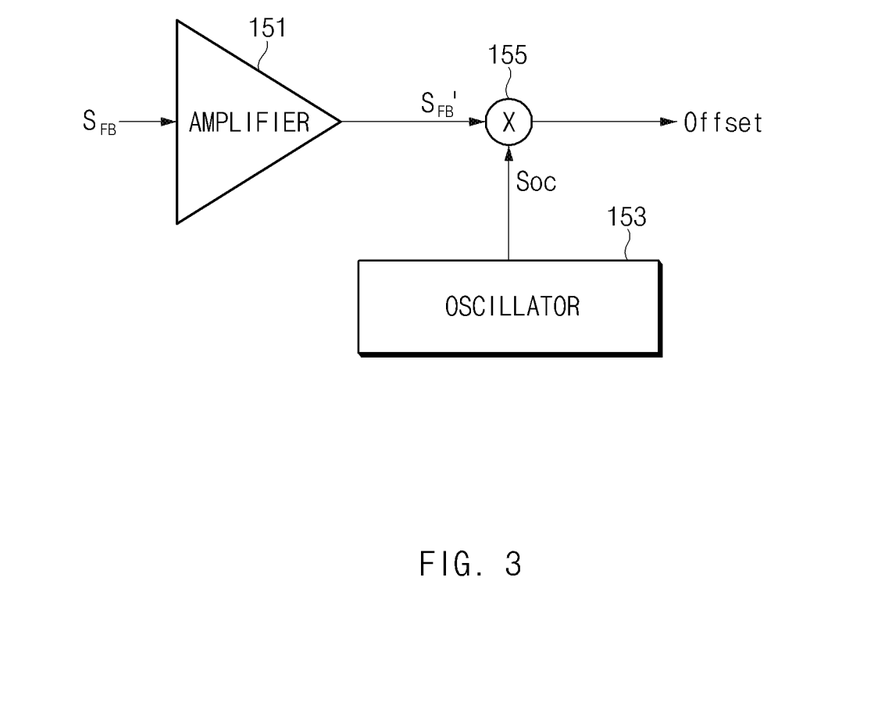
FIG. 3 is a block diagram illustrating a configuration for identifying the frequency of a feedback signal received at a feedback receiver (FBRX) terminal of an electronic apparatus according to an embodiment.

FIG. 3 is a block diagram illustrating a configuration for identifying the frequency of a feedback signal received at a feedback receiver (FBRX) terminal of an electronic apparatus according to an embodiment.

Referring to FIG. 3, the communication circuit 150 may determine whether the frequency $F_1$ of a feedback signal $S_{FB}$ corresponds to a specified frequency $F_S$ through an amplifier 151, an oscillator 153, and a mixer 155.

According to an embodiment, the communication circuit 150 may receive the feedback signal $S_{FB}$ (e.g., the second feedback signal of FIG. 2) from the coupler 130. For example, the feedback signal $S_{FB}$ may be a feedback signal of a signal reflected from the antenna 140. The reflected signal may be a reflection signal of a signal transmitted through the antenna 140. Accordingly, the feedback signal $S_{FB}$ may have the same frequency $f_1$ as the signal output from the amplifier 110.

According to an embodiment, the communication circuit 150 may amplify the transmitted feedback signal $S_{FB}$ through the amplifier 151. The communication circuit 150 may amplify the feedback signal $S_{FB}$ of a small magnitude, using a low noise amplifier (LNA).

According to an embodiment, the communication circuit 150 may generate a signal $S_{OC}$ of the specified frequency $F_S$ through the oscillator 153. The specified frequency $F_S$ may be a frequency of the signal transmitted when the electronic apparatus 100 operates normally.

According to an embodiment, the communication circuit 150 may perform conversion on the amplified signal $S_{FB}'$ with the generated signal $S_{OC}$ through the mixer 153. According to an embodiment, when the converted value is 0, the communication circuit 150 may determine that a normal signal is transmitted.

The electronic apparatus 100 according to various embodiments described with reference to FIGS. 1 to 3 may determine whether there is an error of the transmission signal by identifying the magnitudes and frequencies of the amplified signal and the reflection signal of the amplified signal through the coupler 130, thereby preventing the function of configuration of the electronic apparatus 100 from being lost due to the error of the transmission signal.

Figure 4:
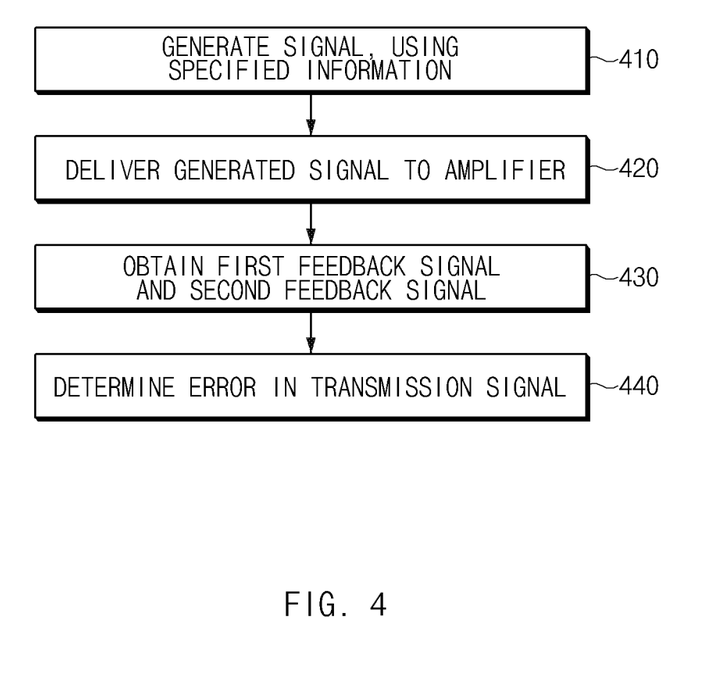
FIG. 4 is a flowchart illustrating a method of detecting an error in a transmission signal of an electronic apparatus according to an embodiment.

FIG. 4 is a flowchart illustrating a method of detecting an error in a transmission signal of an electronic apparatus according to an embodiment.

The flowchart illustrated in FIG. 4 may include operations processed by the above-described electronic apparatus 100. Even though omitted below, detailed descriptions about the electronic apparatus described with reference to FIGS. 1 to 3 may be applied to the flowchart shown in FIG. 4.

According to an embodiment, in operation 410, the electronic apparatus 100 (e.g., the communication circuit 150) may generate a signal, using specified information. For example, the specified information may include information about the frequency and magnitude of a signal transmitted to an external apparatus.

According to an embodiment, in operation 420, the electronic apparatus 100 (e.g., the communication circuit 150) may deliver the generated signal to the amplifier 110.

According to an embodiment, in operation 430, the electronic apparatus 100 (e.g., the communication circuit 150) may obtain a first feedback signal and a second feedback signal for a signal amplified through the amplifier 120, from the coupler 130. For example, the first feedback signal may refer to a feedback signal of the signal amplified through the amplifier. The second feedback signal may refer to a feedback signal of the amplified signal reflected from the antenna 140.

According to an embodiment, in operation 440, the electronic apparatus 100 (e.g., the communication circuit 150) may determine whether there is an error in the signal transmitted to an external apparatus, based on the specified information, the magnitude information of the first feedback signal, and the frequency information of the second feedback signal. For example, when the magnitude of the first feedback signal differs from the specified magnitude by a specified value or more or when the frequency of the second feedback signal does not correspond to the specified frequency, the electronic apparatus 100 may determine that there is an error in the transmission signal. For example, the specified magnitude may be determined based on the magnitude of the signal amplified by the amplifier. The specified frequency may be determined based on the specified information used to generate the signal.

Figure 5:
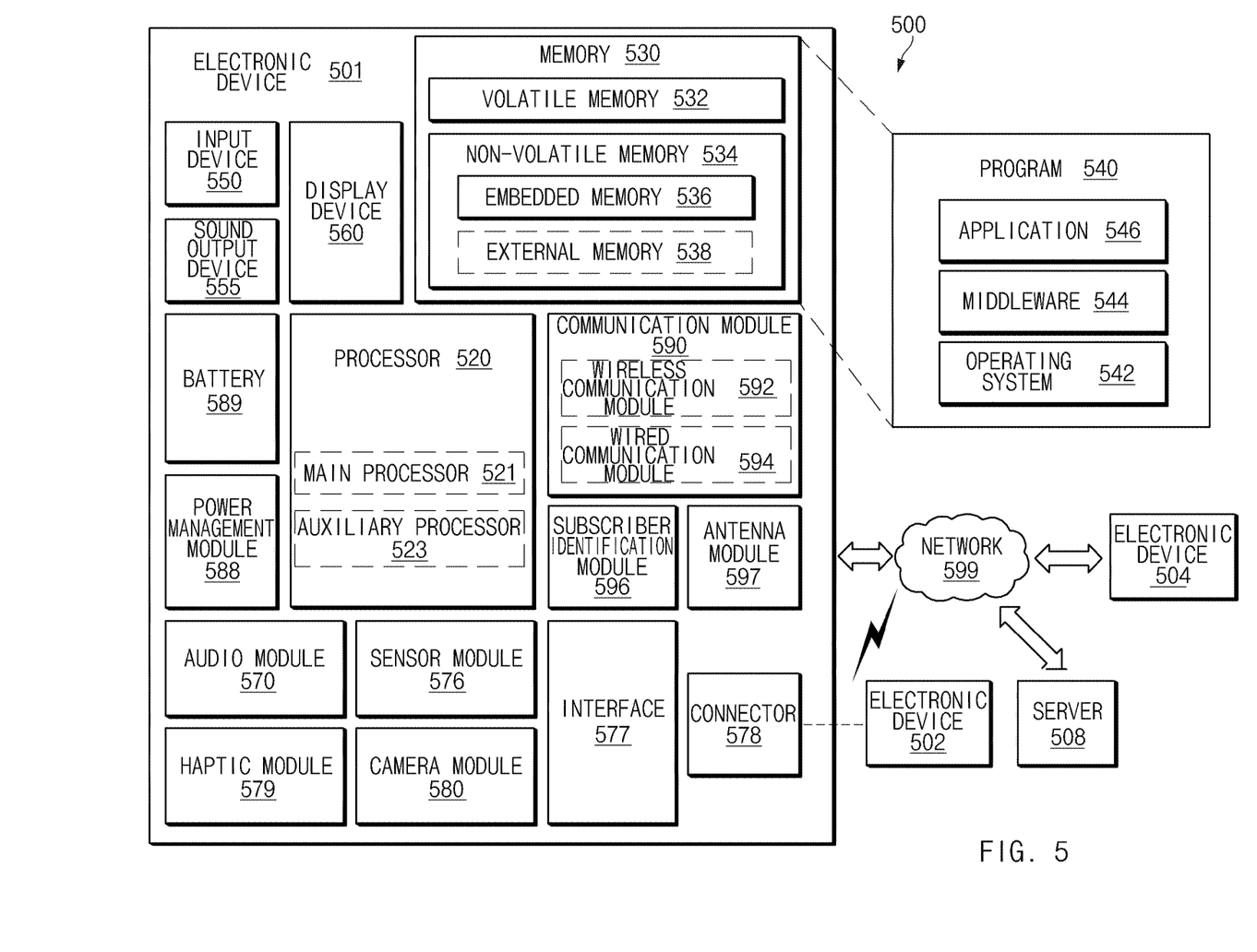
FIG. 5 illustrates a block diagram of an electronic device in a network environment, according to various embodiments.

FIG. 5 is a block diagram of an electronic apparatus in a network environment, according to various embodiments. According to various embodiments disclosed in the disclosure, the electronic apparatus may include various types of devices. For example, the electronic apparatus may include at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate meter, a blood glucose meter, a blood pressure meter, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to an embodiment, the electronic apparatus may include at least one of, for example, a televisions, a digital video disc (DVD) player, an audio device, an audio accessory device (e.g., a speaker, a head phone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic apparatus may include at least one of a navigation device, a global navigation satellite system (GNSS), an event data recorder (EDR) (e.g., a black box for vehicle/ship/airplane), a vehicle infotainment device (e.g., a head-up display for vehicle), an industrial or home robot, a drone, an automatic teller's machine (ATM), a points of sales (POS) device, a measuring instrument (e.g., a water, electricity, or gas measuring instrument), or Internet of things (e.g., a light bulb, a sprinkler device, a fire alarm, a thermostat, or a street lamp). According to an embodiment of the disclosure, the electronic apparatus may not be limited to the above-described electronic apparatuses. In addition, for example, as in the case of a smartphone equipped with a measurement function of personal biometric information (e.g., heartbeat or blood sugar), the electronic apparatus may complexly provide the functions of a plurality of devices. In this specification, the term "user" used herein may refer to a person who uses an electronic apparatus or may refer to a device (e.g., an artificial intelligence electronic apparatus) that uses an electronic apparatus.

Referring to FIG. 5, an electronic apparatus 501 (e.g., the electronic apparatus 100 of FIG. 2) in a network environment 500 may communicate with an electronic apparatus 502 through a short range wireless communication 598 or may communicate with an electronic apparatus 504 or a server 508 over a network 599. According to an embodiment, the electronic apparatus 501 may communicate with the electronic apparatus 504 through the server 508.

FIG. 5 is a block diagram illustrating an electronic device 501 in a network environment 500 according to various embodiments. Referring to FIG. 5, the electronic device 501 in the network environment 500 may communicate with an electronic device 502 via a first network 598 (e.g., a short-range wireless communication network), or an electronic device 504 or a server 508 via a second network 599 (e.g., a long-range wireless communication network). According to an embodiment, the electronic device 501 may communicate with the electronic device 504 via the server 508. According to an embodiment, the electronic device 501 may include a processor 520, memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In some embodiments, at least one (e.g., the display device 560 or the camera module 580) of the components may be omitted from the electronic device 501, or one or more other components may be added in the electronic device 501. In some embodiments, some of the components may be implemented as single integrated circuitry. For example, the sensor module 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520, and may perform various data processing or computation. According to one embodiment, as at least part of the data processing or computation, the processor 520 may load a command or data received from another component (e.g., the sensor module 576 or the communication module 590) in volatile memory 532, process the command or the data stored in the volatile memory 532, and store resulting data in non-volatile memory 534. According to an embodiment, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to an embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to an embodiment, the audio module 570 may obtain the sound via the input device 550, or output the sound via the sound output device 555 or a headphone of an external electronic device (e.g., an electronic device 502) directly (e.g., wiredly) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. According to an embodiment, the sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., wiredly) or wirelessly. According to an embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector), The haptic module 579 may convert an electrical signal into a mechanical stimulus (e.g., a vibration or a movement) or electrical stimulus which may be recognized by a user via his tactile sensation or kinesthetic sensation. According to an embodiment, the haptic module 579 may include, for example, a motor, a piezoelectric element, or an electric stimulator.

The camera module 580 may capture a still image or moving images. According to an embodiment, the camera module 580 may include one or more lenses, image sensors, image signal processors, or flashes.

The power management module 588 may manage power supplied to the electronic device 501. According to one embodiment, the power management module 588 may be implemented as at least part of, for example, a power management integrated circuit (PMIC).

The battery 589 may supply power to at least one component of the electronic device 501. According to an embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the application processor (AP)) and supports a direct (e.g., wired) communication or a wireless communication. According to an embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or infrared data association (IrDA)) or the second network 599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to an embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 540) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic apparatus comprising:
   an amplifier configured to amplify a signal;
   a filter circuit configured to filter the amplified signal;
   a coupler configured to deliver a feedback signal with respect to the filtered signal;
   an antenna configured to radiate the filtered signal to an outside; and
   a communication circuit configured to generate the signal,
   wherein the communication circuit is configured to:
      generate a signal, using specified information;
      deliver the generated signal to the amplifier;
      obtain a first feedback signal and a second feedback signal with respect to signals amplified through the amplifier, from the coupler; and
      determine there is an error in a signal transmitted to an external apparatus, when a magnitude of the first feedback signal differs from a specified magnitude by a specified value or more or when a frequency of the second feedback signal does not correspond to a specified frequency,
   wherein the specified magnitude is determined based on a magnitude of the signal amplified by the amplifier, and
   wherein the specified frequency is determined based on the specified information used to generate the signal.

2. The electronic apparatus of claim 1, wherein the communication circuit generates a signal of the specified frequency and performs conversion on the generated signal with the second feedback signal to determine whether the frequency of the second feedback signal corresponds to the specified frequency.

3. The electronic apparatus of claim 1, wherein the first feedback signal is a feedback signal for the signal amplified through the amplifier, and
   wherein the second feedback signal is a feedback signal for a reflection signal of the amplified signal.

4. The electronic apparatus of claim 3, wherein the reflection signal is a signal reflected from the antenna.

5. The electronic apparatus of claim 3, wherein the coupler is a bidirectional coupler that delivers a feedback signal of each of the amplified signal and the reflection signal to the communication circuit.

6. The electronic apparatus of claim 1, wherein the filter circuit includes a duplexer that radiates a signal delivered from the amplifier to the antenna and delivers a signal received through the antenna to the communication circuit.

7. The electronic apparatus of claim 1, wherein the specified information includes information about a frequency and a magnitude of the signal transmitted to the external apparatus.

8. The electronic apparatus of claim 1, wherein the communication circuit stops generating the signal, when it is determined that the error is present in the transmitted signal.

9. A control method of an electronic apparatus, the method comprising:
   generating a signal, using specified information;
   delivering the generated signal to an amplifier;
   obtaining a first feedback signal and a second feedback signal with respect to signals amplified through the amplifier, from a coupler; and
   determining there is an error in a signal transmitted to an external apparatus, when a magnitude of the first feedback signal differs from a specified magnitude by a specified value or more or when a frequency of the second feedback signal does not correspond to a specified frequency,
   wherein the specified magnitude is determined based on a magnitude of the signal amplified by the amplifier, and
   wherein the specified frequency is determined based on the specified information used to generate the signal.

10. The method of claim 9, wherein the determining of whether the frequency of the second feedback signal does not correspond to the specified frequency includes:
    generating a signal of the specified frequency; and
    performing conversion on the generated signal with the second feedback signal to determine whether the frequency of the second feedback signal corresponds to the specified frequency.

11. The method of claim 9, wherein the first feedback signal is a feedback signal for the signal amplified through the amplifier, and
    wherein the second feedback signal is a feedback signal for a reflection signal of the amplified signal.

* * * * *